United States Patent [19]

Choe et al.

[11] Patent Number: 5,221,431
[45] Date of Patent: Jun. 22, 1993

[54] METHOD FOR ADHESION PROMOTION OF POLYETHYLENE FIBER/VINYL ESTER RESIN COMPOSITE

[75] Inventors: Chul R. Choe; Jyong S. Jang, both of Seoul, Rep. of Korea

[73] Assignee: Korea Institute of Science and Technology, Seoul, Rep. of Korea

[21] Appl. No.: 649,047

[22] Filed: Feb. 1, 1991

[30] Foreign Application Priority Data

Jun. 23, 1990 [KR]  Rep. of Korea .................. 90-9346

[51] Int. Cl.$^5$ ........................................... H01L 21/00
[52] U.S. Cl. ................................... 156/668; 427/307;
427/322; 427/389.9; 427/393.5; 427/387;
156/643
[58] Field of Search ................... 427/307, 322, 389.9,
427/393.5, 387; 156/643, 668

[56] References Cited

U.S. PATENT DOCUMENTS

| | | | |
|---|---|---|---|
| 4,410,586 | 10/1983 | Ladizesky et al. | 427/307 |
| 4,637,851 | 1/1987 | Ueno et al. | 156/643 |
| 4,842,934 | 6/1989 | Cordova et al. | 427/387 |

OTHER PUBLICATIONS

Donald F. Adams et al., "Properties of a Polymer-Matrix Composite Incorporating Allied A-900 Polyethylene Fiber," Proceedings of the 30th National SAMPE Symposium, Mar. 19-21, 1985, pp. 280-289.

Ronald F. Gibson et al., "Vibration Damping Characteristics of Highly Oriented Polyethylene Fiber Reinforced Epoxy Composites," Proceedings of the 32nd International SAMPE Symposium, Apr. 6-9, 1987, pp. 231-244.

H. X. Nguyen et al., "Optimization of Polyethylene Fiber Reinforced Composited Using a Plasma Surface Treatment," Proceedings of the 33rd International SAMPE Symposium, Mar. 7-10, 1988, pp. 1721-1729.

S. L. Kaplan et al., "Gas Plasma Treatment of Spectra Fiber," Proceedings of the 33rd International SAMPE Symposium, Mar. 7-10, 1988 pp. 551-559.

I. M. Ward and N. H. Ladizesky, "High Modulus Polyethylene Fibers and Their Composites," Composite Interfaces, H. Ishida and J. L. Koenig, Ed., Elsevier Science Publishing Co., Inc., New York, 1986, pp. 37-46.

Primary Examiner—Tom Thomas
Assistant Examiner—George Goudreau
Attorney, Agent, or Firm—Oblon, Spivak, McClelland, Maier & Neustadt

[57] ABSTRACT

A new method for promoting adhesion of a polyethylene fiber/vinyl ester resin composites is provided. The method of the present invention comprises subjecting a fabric made from polyethylene fibers to plasma etching, applying a silane coupling agent to the etched fabric, and impregnating the fabric with vinyl ester resins, followed by the conventional molding.

4 Claims, No Drawings

METHOD FOR ADHESION PROMOTION OF POLYETHYLENE FIBER/VINYL ESTER RESIN COMPOSITE

BACKGROUND OF THE INVENTION

1. Filed of the Invention

The present invention relates to a method for promoting adhesion of ultra high modulus a composite consisting of polyethylene (UHMPE) fibers and vinyl ester resins. More particularly, the present invention relates to a process for promoting adhesion of a UHMPE fiber/vinyl ester resin composite.

2. Description of the Prior Art

Ultra high modulus polyethylene fibers having a density of ⅗ of Kevlar fiber and ½ of carbon fiber represent a high specific strength [see, 30th National SAMPE Symposium, p. 280, 1985]. Due to this property, ultra high modulus polyethylene fibers have been used in helicopter pannel, airplain interior material, tennis racket, ski, golf club and other various structural material [see, 32nd International SAMPE Symposium, p. 230, 1987].

However, it has been reported that in the case of using the ultra high modulus polyethylene fibers in composites, delamination at the interface between the fibers and the matrix resins happens due to poor reactivity between the fibers and the matrix resins; thereby the physical properties of composites become lowered [see, 33rd International SAMPE Symposium, p. 721, 1988].

As an approach to overcome the above disadvantages, several methods have been proposed. In accordance with one of these methods, the reactivity of the fibers with the matrix resins is enhanced by subjecting the surface of the fibers to a cold plasma etching treatment [see, 33rd International SAMPE Symposium, p 551, 1988]. However, these methods suffer from the disadvantages that the functional groups on the modified surface of the fibers are deteriorated rapidly with the lapse of time and their reactivity with the matrix resins become lowered accordingly.

Another approach was the chemical treatment where the surface of ultra high modulus polyethylene fibers is modified by a chromic acid solution of strong oxidizer [see, Composite Interfaces, p. 37, 1986]. However, this method may render the strength of the fiber degraded by chromic acid used, and the waste liquids from this method may result in the pollution of environment.

SUMMARY OF THE INVENTION

The primary object of the invention is to provide a new method for preventing delamination in a composite consisting of ultra high modulus polyethylene fibers and vinyl ester resins.

Another object of the invention is to provide a new method for improving adhesion of the same composite by means of the enhancement of the reactivity between the ultra high modulus polyethylene fibers and the vinyl ester resins.

These and other objects of the invention can be achieved by the method according to the present invention which comprises subjecting a fabric made from ultra high modulus polyethylene fibers to plasma etching; applying a silane coupling agent to the etched fabric; and then impregnating the fabric with vinyl ester resins.

The surface of the ultra high modulus polyethylene fiber can be modified by means of the cold plasma etching treatment. The functional groups on the surface can be blocked by applying a silane coupling agent onto the surface thus modified.

DETAILED DESCRIPTION OF THE INVENTION

The silane coupling agent forms a intermediate layer between the ultra high modulus polyethylene fiber and the epoxy resin, which not only improves the reactivity of the fiber with the resin, but also protects the surface of the fiber after etching. Hydroxy and/or amino groups of silane coupling agents form a covalent linkage with epoxy groups of the vinyl ester resins, while forming another covalent linkage and hydrogen linkage with carboxyl and hydroxy groups on the surface of the ultra high modulus polyethylene fibers.

The silane coupling agent useful in the method of the invention include:

γ-methacryloxypropyltrimethoxysilane (γ-MPS) of Formula $CH_2=C(CH_3)COO(CH_2)_3Si(OCH_3)_3$;

γ-aminopropyltriethoxysilane (γ-APS) of Formula $H_2NCH_2CH_2CH_2Si(OC_2H_5)_3$;

vinyltriacetoxysilane (VTS) of Formula $CH_2=CHSi(OOC-CH_3)_3$; and 3-(N-styrylmethyl-2-aminoethylamino)propyltrimethoxysilane (SAPS) of Formula

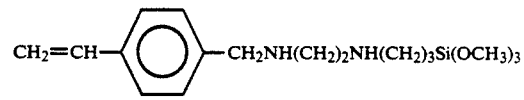

The plasma etching system is not critical in the method of the present invention. However, a plasma polymerization system Model PD-2 (SAMCO, Japan) can preferably be used in the invention. This system preferably operates at a power of 100 watt and under an oxygen atomsphere.

The ultra high modulus polyethylene fibers are not critical in the method of the present invention. However, SPECTRA 900 sold by The Allied Signal Company (U.S.A.) can preferably be used in the invention.

According to the invention, a fabric made from ultra high modulus polyethylene fibers is treated by a Soxhlet apparatus in the presence of an extracting solvent to remove impurities, and the fabric is then dried in a vacuum.

The above treated polyethylene fibric is placed in a plasma etching system using oxygen as a carrier gas to conduct etching on both of its surfaces. The etching system operates at a power of 20 to 250 Watts, and the etching is usually conducted for 1 to 30 minutes.

Then, the etched polyethylene fabric is coated with a silane coupling agent, followed by drying. The silane coupling agent is used at a concetration of 0.05 to 10% by weight after subjecting the same to hydrolysis in the presence of a solvent. A mixed solution of n-butanol/water (W/W 95:5) can be used as such a solvent.

The above coated polyethylene fabric is impregnated with a vinyl ester resin and then cured. Any of the commercially available epoxy resins can be used in the method of the invention. DERAKANE 8084, a vinyl ester resin, sold by The Dow Chemical Company (U.S.A.) is preferred. t-Butyl peroxybenzoate can be used as a polymerization initiator and acetone/isopropyl alcohol (W/W 1:1) is used as a diluent.

A number of the polyethylene fabric thus treated is layed up and molded in a blanket press mold to form a composite. The molding pressure and temperature are 3 to 15 atm. and 90° to 130° C., respectively.

DESCRIPTION OF THE PREFERRED EMBODIMENT

The invention will be illustrated in greater detail by way of the following examples. The examples are presented for illustrative purpose and should not be construed as limiting the invention which is properly delineated in the claims.

EXAMPLE 1

A fabric (15 cm×15 cm in size) was prepared from ultra high modulus polyethylene fibers having a molecular weight of about 2,500,000. The fabric was extracted for 24 hrs. in a Soxhlet apparatus using n-butanol as a solvent to remove impurities on its surface and dried in a vacuum of 5 mmHg at 25° for 12 hrs. The dried fabrics were placed in a plasma etching apparatus using, oxygen as a carrier gas and operating at a power of 100 Watts to undergo surface etching for 1, 3, 5, 7.5 and 10 min., respectively.

VTS was hydrolyzed in a mixed solvent of n-butanol/water (95:5 w/w) at a pH of 3.5 for an hour to give a hydrolyzed silane coupling agent, which was applied onto the above etched fabrics after diluting it to a concentration of 0.2% by weight.

The above treated fabrics were subjected to impregnation with DERAKANE 8084, which was a rubber modified vinyl ester resin, to produce a prepreg. At this moment, t-butyl peroxybenzoate was used as a polymerization initiator and a mixed solution of acetone/isopropanol (W/W 1:1) was used as a diluent.

Six sheets of the prepregs thus produced (fiber volume ratio: 60%) were layed up and molded in a blanket press mold at 115° under 10.0 atm. for 30 min. to form a composite.

The adhesion of the composite thus obtained was evaluated by measuring the interlaminar shear strength of the same in accordance with the testing method of ASTM D 2344. The specimen used in this test was 10 mm in width and 15 mm in gauge length. The increasement in adhesion was presented with relative values regarding the interlaminar shear strength of the untreated polyethylene fabric as a value of 100.

The result of the evaluation is shown in Table 1 below.

TABLE 1

| Time for Plasma Treatment (min.) | Interlaminar Shear Strength (MPa) | Increasement in Adhesion (%) |
|---|---|---|
| 1.0 | 11.50 | 124 |
| 3.0 | 13.85 | 150 |
| 5.0 | 16.30 | 176 |
| 7.5 | 18.75 | 203 |
| 10.0 | 16.90 | 183 |

EXAMPLE 2

The same procedure as in Example was repeated, except that SAPS was used as a silane coupling agent in place of VTS.

The results are shown in Table 2 below.

TABLE 2

| Time for Plasma Treatment (min.) | Interlaminar Shear Strength (MPa) | Increasement in Adhesion (%) |
|---|---|---|
| 1.0 | 14.70 | 159 |
| 3.0 | 16.30 | 176 |
| 5.0 | 18.40 | 199 |
| 7.5 | 20.67 | 223 |
| 10.0 | 14.30 | 155 |

EXAMPLE 3

The same procedure as in Example was repeated, except that γ-MPS was used as a silane coupling agent in place of VTS.

The results are shown in Table 3 below.

TABLE 3

| Time for Plasma Treatment (min.) | Interlaminar Shear Strength (MPa) | Increasement in Adhesion (%) |
|---|---|---|
| 1.0 | 15.25 | 165 |
| 3.0 | 17.67 | 191 |
| 5.0 | 19.10 | 206 |
| 7.5 | 22.75 | 246 |
| 10.0 | 15.80 | 171 |

EXAMPLE 4

The same procedure as in Example 1 was repeated, except that γ-APS was used as a silane coupling agent in place of VTS.

The results are shown in Table 4 below.

TABLE 4

| Time for Plasma Treatment (min.) | Interlaminar Shear Strength (MPa) | Increasement in Adhesion (%) |
|---|---|---|
| 1.0 | 12.83 | 139 |
| 3.0 | 14.33 | 155 |
| 5.0 | 15.13 | 164 |
| 7.5 | 15.83 | 171 |
| 10.0 | 13.17 | 142 |

COMPARATIVE EXAMPLE 1

The same procedure as in Example 1 was repeated, except that after a cold plasma etching, a UHMPE fabric was impregnated with vinyl ester without conducting application of silane coupling agents.

The results are shown in Table 5 below.

TABLE 5

| Time for Plasma Treatment (min.) | Interlaminar Shear Strength (MPa) | Increasement in Adhesion (%) |
|---|---|---|
| 1.0 | 9.25 | 114 |
| 3.0 | 10.55 | 125 |
| 5.0 | 11.60 | 156 |
| 7.5 | 14.40 | 187 |
| 10.0 | 16.50 | 178 |

COMPARATIVE EXAMPLE 2

The same procedure as in Example 1 was repeated, except that after removing impurities, a UHMPE fabric was coated with VTS, SAPS, γ-MPS and γ-APS, respectively and, then impregnated with vinyl ester resins without undergoing a low temperature plasma etching.

The results are as shown in Table 6 below.

TABLE 6

| Time for Plasma Treatment (min.) | Interlaminar Shear Strength (MPa) | Increasement in Adhesion (%) |
| --- | --- | --- |
| VTS | 10.40 | 112 |
| SAPS | 13.67 | 148 |
| γ-MPS | 13.20 | 143 |
| γ-APS | 12.00 | 130 |

EXAMPLES 5 TO 8

The same procedure as in Example 1 was repeated, except that the concentration of silane coupling agents, VTS (Example 5), SAPS (Example 6), γ-MPS (Example 7) and γ-APS (Example 8) was varied from 0.05 to 1.0 % by weight, with the plasma etching being conducted for 5 min.

The results are as shown in Table 7 below.

TABLE 7

| Exampl. No. (Coupling Agent) | Silane Coating Concentration (wt %) | Interlaminar Shear Strength (MPa) | Increasement in Adhesion (%) |
| --- | --- | --- | --- |
| 5 (VTS) | 0.05 | 15.00 | 162 |
| | 0.10 | 15.67 | 169 |
| | 0.20 | 16.30 | 176 |
| | 0.30 | 18.75 | 203 |
| | 0.50 | 17.88 | 193 |
| | 1.00 | 16.25 | 176 |
| 6 (SPAS) | 0.05 | 15.67 | 169 |
| | 0.10 | 16.90 | 183 |
| | 0.20 | 18.40 | 199 |
| | 0.30 | 19.80 | 214 |
| | 0.50 | 16.30 | 176 |
| | 1.00 | 15.90 | 172 |
| 7 (γ-MPS) | 0.05 | 15.25 | 165 |
| | 0.10 | 17.67 | 191 |
| | 0.20 | 19.10 | 206 |
| | 0.30 | 20.80 | 225 |
| | 0.50 | 17.50 | 189 |
| | 1.00 | 15.80 | 171 |
| 8 (γ-APS) | 0.05 | 14.60 | 158 |
| | 0.10 | 14.80 | 160 |
| | 0.20 | 15.13 | 164 |
| | 0.30 | 17.60 | 190 |
| | 0.50 | 16.33 | 177 |
| | 1.00 | 15.00 | 162 |

What is claimed is:

1. A method for promoting adhesion of an ultra high modulus polyethylene fiber/vinyl ester resin composite, which comprises subjecting a fabric made from ultra high modulus polyethylene fibers to plasma etching; applying a silane coupling agent in hydrolyzed form to the etched fabric; and then impregnating the fabric with vinyl ester resins.

2. The method of claim 1, wherein the silane coupling agent is selected from the group consisting of γ-methacryloxypropyltrimethoxysilane, γ-aminopropyltriethoxysilane, vinyltriacetoxysilane and 3-(N-styrylmethyl-2-aminoethylamino)propyltrimethoxysilane.

3. The method of claim 1, wherein the plasma etching treatment is conducted at a power of 100 watts for a period of 1.0 to 10.0 min.

4. The method of claim 1, wherein the silane coupling agent is applied at an amount of 0.05 to 10.0% by weight.

* * * * *